United States Patent Office 3,796,574
Patented Mar. 12, 1974

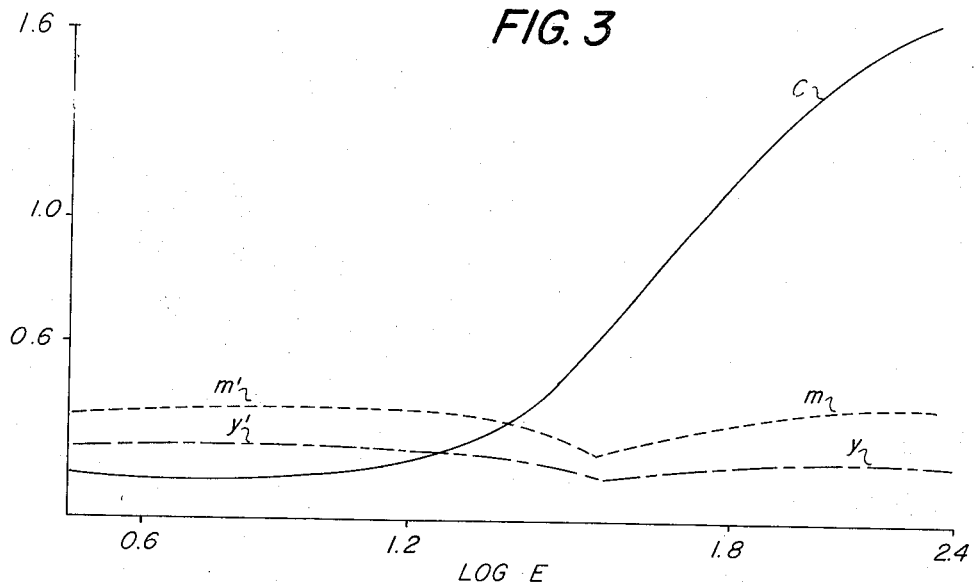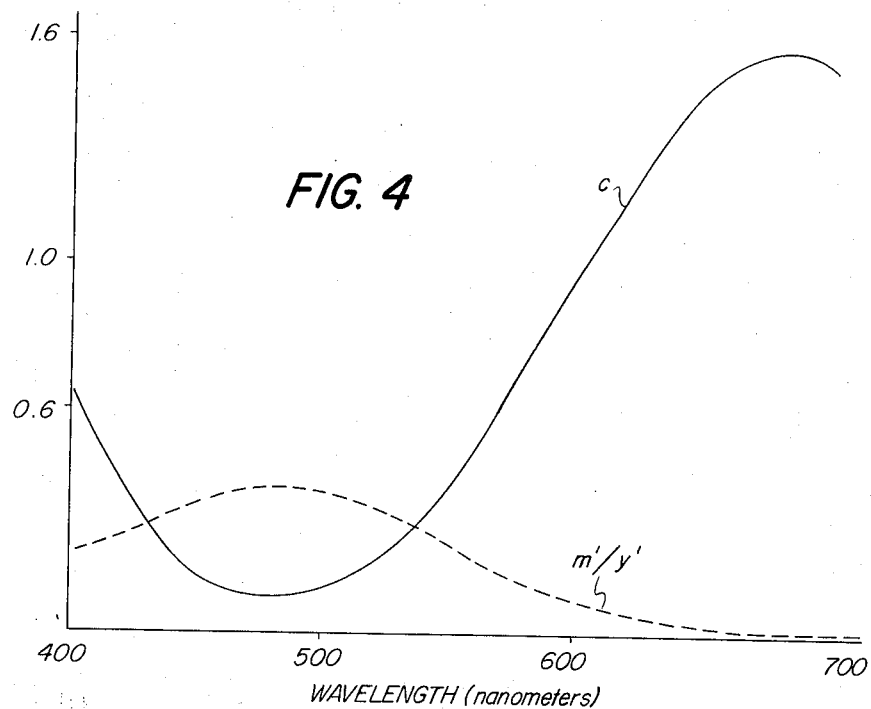

3,796,574
PHOTOGRAPHIC COMPOSITIONS AND PROCESSES FOR THE FORMATION OF INTEGRAL COLOR MASKS
John Figueras, Rochester, N.Y., assignor to Eastman Kodak Company, Rochester, N.Y.
Filed May 3, 1972, Ser. No. 249,952
Int. Cl. G03c 5/30, 7/00, 7/04
U.S. Cl. 96—9                                        9 Claims

ABSTRACT OF THE DISCLOSURE

Compositions and processes are disclosed for the preparation of photographic integral colored masks in negative color elements by treating the element, after initial exposure, conventional color development and overall reexposure, with a second color developing solution which contains a p-sulfonamidoaniline color developing agent. Treatment with the second color developing solution results in a positive mask that corrects unwanted absorptions of the dye image formed by the conventional color development step.

---

Figure 1:
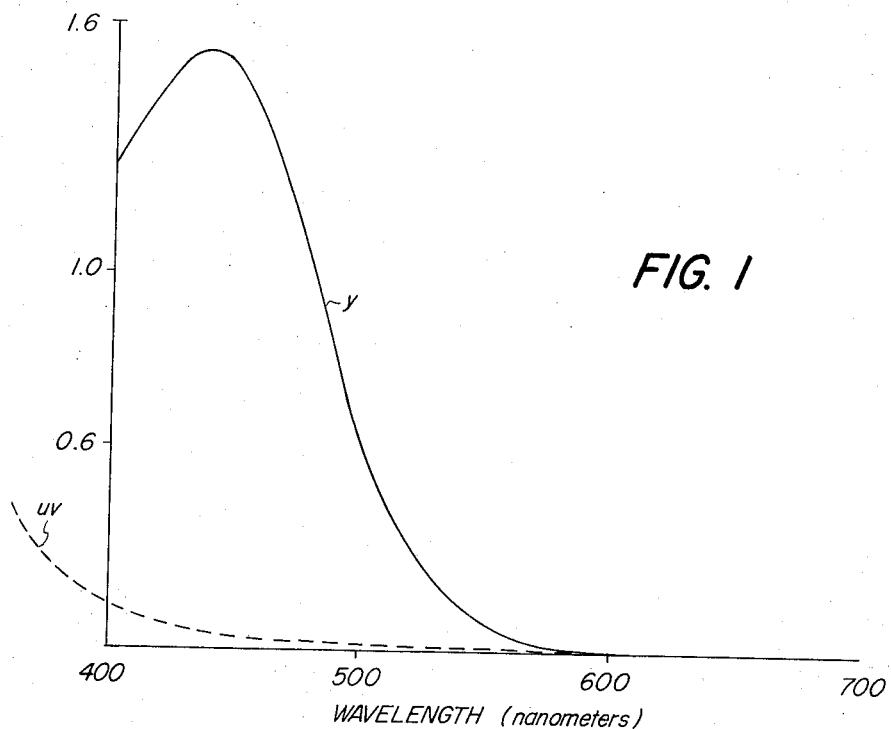

This invention relates to compositions and processes for the production of photographic dye images, and more particularly to integral color masking procedures.

It is known that dyes used in substractive multicolor photographic pictures do not transmit all of the light which theoretical considerations demand. The cyan dye which should absorb red light and transmit green and blue light usually absorbs a small amount of green and blue light as well as a major proportion of red light. The magenta dye which should absorb green light and transmit blue and red light usually absorbs a considerable amount of blue light and a small amount of red light. The yellow dye which should absorb blue light and transmit green and red light absorbs a small amount of green light. The result of printing a multicolor picture formed from such dyes is to introduce unequal parts of all three color records in each image which is made regardless of the color of light which is used in printing or the sensitivity of the printing material employed.

Due to the above mentioned unwanted side-absorptions of the dyes formed by color development, it is practically impossible to obtain a true reproduction of the original colors on printing multicolor photographic transparencies containing such dyes.

Correction of the colors on printing is therefore desirable, and this is usually done by masking. Since separate masks are difficult to register with the color transparency, it is desirable that the mask be integral with the colored images.

A method of producing an integral colored mask involving the use of colored couplers in a color coupling process is described in Hanson, U.S. Pat. No. 2,449,966 of Sept. 21, 1948. According to the method of the Hanson patent, azo dye derivatives of couplers are used which are destroyed wherever a dye image is formed by color coupling.

Jaeken et al., U.S. Pat. 3,245,788 teaches an integral masking procedure wherein the mask-forming compounds are incorporated in the photographic element. According to Jaeken et al., color corrected images can be formed by treating an imagewise exposed and color developed photographic element comprising a silver halide emulsion layer and a color coupler, which reacts with the oxidation product of an aromatic amino developing agent to form by color development a primary dye image, with an oxidizing solution, such as a photographic bleaching bath, in the presence of a amidrazone compound.

Young, U.S. Pat. 2,518,739 shows an integral masking procedure wherein the color masks in a multilayer film having red-, green-, and blue-sensitive layers containing the appropriate couplers, are produced by exposing the film and developing it to negative silver and dye images by treatment with a primary aromatic amino developing agent. The red-sensitive layer is then exposed with red light and developed with an aromatic hydrazine to form a red-to-orange positive azo dye masking-image. The green-sensitive layer is exposed with green light and developed with a different aromatic hydrazine to form a yellow positive azo dye masking-image. The negative dye images and the positive azo dye images are left in the film. Separate exposures and different developing agents for the red- and green-sensitive layers are preferred, thus providing a method of controlling the composition of the masking dyes formed in the two layers.

In those masking systems of the prior art wherein the masking forming compounds are incorporated in the photographic element, such compounds may physically, chemically, or spectrophotometrically adversely affect the characteristics of the photographic material. In those prior art masking systems wherein residual silver or color formers are treated with mask-forming compounds contained in a post-color development processing bath, masking is generally restricted to only one of the three separate dye image layers typically contained in a negative color element.

It is therefore an object of this invention to provide a process for forming integral color masks in negative color photographic elements, which masks correct unwanted absorptions of the dye image, by use of a novel mask-forming developing solution.

Another object of this invention is to provide a novel process for forming integral color masks in multilayer color photographic elements wherein the sepectrophotometric characteristic of the elements are not affected.

Another object of this invention is to provide novel color processing compositions for the formation of integral color masks in negative color photographic elements.

In accordance with this invention, I have found a process for forming integral color masks in negative photographic elements comprising (1) a support, and (2) at least one layer thereon containing a silver halide emulsion having associated therewith a color-forming coupler, wherein said element, after (1) imagewise exposure, (2) processing in a first color developing solution and (3) overall reexposure, is then (4) processed in a second color developing solution which contains a p-sulfonamido-aniline color developing agent.

During the first color development step, oxidized color developing agent, formed in the imagewise exposed areas of the element, reacts with the color coupler to form a dye image, while during the second color development step, oxidized p-sulfonamidoaniline color developing agent, formed during development of the reexposed silver halide, reacts with residual color coupler to form a color mask image which corrects for unwanted absorptions of the dye image.

The integral color masks formed in accordance with this invention are stable to light and heat and in many embodiments they are substantially unaffected by the pH changes associated with most photographic elements. Moreover, these integral color masks have desirable spectrophotometric properties including useful absorption maxima within the visible spectrum, narrow bandwidths and relatively low extinction coefficients. In addition, these integral color masks appear to overcome the problems of prior-art masking systems, especially in that they do not physically, chemically, or spectrophotometrically adversely influence the characteristics of the photographic elements.

FIGS. 1–4, which form a part of the specification are spectral absorption curves of several integral mask images produced according to this invention and the dye images with which they are associated. Further details with respect to these figures are set forth in the examples.

In a preferred embodiment of this invention, integral color masks are formed in a multilayer photographic element comprising a support, a layer thereon containing a blue-sensitive silver halide composition having associated therewith a yellow color coupler, a layer containing a green-sensitive silver halide emulsion having associated therewith a magenta color coupler and a layer containing a red-sensitive silver halide emulsion having associated therewith a cyan color coupler.

In this preferred element, during the second color development step, oxidized p-sulfonamidoaniline reacts with residual coupler in the initially red-sensitive silver halide emulsion layer to form a blue-green absorbing masking image which is opposite in gradation to the associated cyan colored primary dye image produced during the conventional first color development step. Similarily, a blue absorbing mask is produced in the initially green-sensitive silver halide emulsion layer, the mask being associated with and opposite in gradation to the primary magenta dye image produced in this layer during the first color development step. Residual coupler in the initially blue-sensitive silver halide emulsion layer reacts with oxidized p-sulfonamidoaniline to produce an essentially colorless product. The spectrophotometric absorption peak of this colorless product lies in the UV region of the electromagnetic spectrum. According to this embodiment, therefore, the mask produced in association with the cyan image corrects for the unwanted absorption of the cyan image dye to green light, and the mask associated with magenta dye image corrects for the unwanted absorption of the magenta image to blue light. The essentially colorless reaction product produced in the nonimage areas of the initially blue-sensitive silver halide emulsion layer provides desirable UV protection to the photographic element.

The p-sulfonamidoanilines which in the oxidized form react to provide the integral color masks of this invention can be used as the free amine or as an acid salt thereof. Free amines of suitable p-sulfonamidoanilines include those represented by the formula

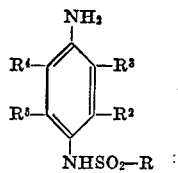

wherein $R^1$ is an alkyl group of 1–8 carbon atoms such as methyl, ethyl, propyl, butyl, pentyl, hexyl, heptyl, octyl, etc., an aryl group including substituted aryl groups of 6–20 carbon atoms such as phenyl, naphthyl, tolyl, etc., $R^2$, $R^3$, $R^4$ and $R^5$ are each, independently, hydrogen, halogen, an alkyl group, or an alkoxy group, wherein the alkyl group and the alkyl portion of the alkoxy group have have from 1–8 carbon atoms, and preferably 1–4 carbon atoms, such as methyl, ethyl, propyl, butyl, hexyl, heptyl, methoxy, ethoxy, propoxy, pentoxy, octyloxy, etc. Exemplary p-sulfonamidoanilines according to this formula are:

2-methoxy-4-benzenesulfonamidoaniline hydrochloride,
3-methoxy-4-benzenesulfonamidoaniline hydrochloride,
5-methoxy-4-benzenesulfonamidoaniline,
6-methoxy-4-benzenesulfonamidoaniline,
2,5-dimethoxy-4-benzenesulfonamidoaniline hydrochloride,
2,6-dimethoxy-4-benzenesulfonamidoaniline,
2-ethoxy-4-benzenesulfonamidoaniline hydrochloride,
3-butoxy-4-benzenesulfonamidoaniline,
5-octoxy-4-benzenesulfonamidoaniline hydrochloride,
2,5-diethoxy-4-benzenesulfonamidoaniline hydrochloride,
2,6-diethoxy-4-benzenesulfonamidoaniline,
3,6-dimethoxy-4-methanesulfonamidoaniline hydrochloride,
3-methyl-6-methoxy-4-methanesulfonamidoaniline hydrochloride,
2,5-dimethoxy-4-methanesulfonamidoaniline,
2-methoxy-6-methyl-4-ethanesulfonamidoaniline,
5-chloro-2-pentoxy-4-benzenesulfonamidoaniline hydrochloride,
6-chloro-2-methoxy-4-benzenesulfonamidoaniline,
5-chloro-3-methoxy-4-benzenesulfonamidoaniline,
6-chloro-3-methoxy-4-benzenesulfonamidoaniline hydrochloride,
2-methyl-4-benzenesulfonamidoaniline hydrochloride,
3-methyl-4-benzenesulfonamidoaniline,
5-butyl-4-benzenesulfonamidoaniline hydrochloride,
6-octyl-4-benzenesulfonamidoaniline hydrochloride,
2-ethyl-4-benzenesulfonamidoaniline hydrochloride,
5-ethyl-4-benzenesulfonamidoaniline,
2,5-dimethyl-4-benzenesulfonamidoaniline hydrochloride,
2,6-dimethyl-4-benzenesulfonamidoaniline,
3,5-dimethyl-4-benzenesulfonamidoaniline,
3,6-dimethyl-4-benzenesulfonamidoaniline hydrochloride,
2,5-diethyl-4-benzenesulfonamidoaniline hydrochloride,
2,6-dibutyl-4-benzenesulfonamidoaniline,
3,5-dihexyl-4-benzenesulfonamidoaniline hydrochloride,
3,6-dioctyl-4-benzenesulfonamidoaniline hydrochloride,
and the like.

The first color development can be conducted in any of the conventional primary amino developer solutions. Any of the well-known primary aromatic amino developing agents such as phenylenediamines, p-aminophenols and their substitution products can be used in the developing solution. Various other materials can be included in the developer solution depending upon the particular requirements, for example, an alkali metal sulfite, carbonate, bisulfite, bromide, iodide, etc.

The mask forming color developer solutions of this invention comprise a p-sulfonamidoaniline developing agent in place of the conventional developing agents used in the first color development.

The couplers which are generally useful in the elements processed in accordance with this invention are those compounds which have an active coupling group which will react with an oxidized aromatic primary amine color developing agent, such as exemplified by the many couplers which have been used in the prior-art in combination with p-phenylenediamines. The compounds contain a "coupling position" which is generally known to those skilled in the art as being the position on the coupler molecule that reacts or couples with oxidized color developing agents. Typical useful couplers include phenolic couplers, including α-naphthols, which couple at the 4-position, open-chain ketomethylene couplers which couple at the carbon atom forming the methylene moiety (e.g.,

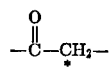

wherein * denotes the coupling position), 5-pyrazolone couplers which couple at the carbon atom in the 4-position, and the like. Typical specific coupler compounds which can be reacted with oxidized p-phenylenediamines to form the image dye by conventional methods are disclosed in U.S. Pats. 2,407,210 by Weissberger et al., issued Sept. 3, 1946; 2,298,443 by Weissberger, issued Oct. 13, 1942; 2,875,057 by McCrossen et al., issued Feb. 24, 1959; 3,265,506 by Weissberger et al., issued Aug. 9, 1966; 3,408,194 by Loria, issued Oct. 29, 1968; 3,447,928 by Loria, issued June 3, 1969; 2,369,489 by Porter et al., issued Feb. 13, 1945; 2,600,788 by Loria et al., issued June 17, 1952; 2,908,573 by Bush et al., issued Oct. 13, 1959; 3,062,653 by Weissberger et al., issued Nov. 6, 1962; 3,419,391 by Young, issued Dec. 31, 1968; 3,519,429 by Lestina, issued July 7, 1970; 3,152,896 by Tuite, issued Oct. 13, 1964; 2,423,730 by Salminen et al., issued July 8, 1947; 2,474,293 by Weissberger et al., issued June 28, 1949; 3,476,563 by Loria, issued Nov. 4, 1969; 2,772,162 by Salminen et al., issued Nov. 27, 1956; and 3,002,836 by Vittum et al., issued Oct. 3, 1961; which are incorporated herein by reference.

The silver halide emulsions used with this invention can comprise silver chloride, silver bromide, silver bromoiodide, silver chlorobromoiodide or mixtures thereof. The emulsions may be course- or fine-grain and can be prepared by any of the well-known procedures, e.g., single-jet emulsions, double-jet emulsions, such as Lippmann emulsions, ammoniacal emulsions, thiocyanate or thioether ripened emulsions such as those described in U.S. Pats. 2,222,264 by Nietz et al., 3,320,069 by Illingsworth, and 3,271,157 by McBride. Surface-image emulsions can be used or internal-image emulsions can be used such as those described in U.S. Pats. 2,592,250 by Davey et al., 3,206,313 by Porter et al., and 3,447,927 by Bacon et al. The emulsions may be regular-grain emulsions such as the type described in Klein and Moisar, J. Phot. Sci., vol. 12, No. 5, September/October, 1964, pp. 242–251. If desired, mixtures of surface- and internal-image emulsions can be used as described in Luckey et al., U.S. Pat. 2,996,382.

Negative-type emulsions can be used or direct-positive emulsions can be used such as those described in U.S. Pats. 2,184,013 by Leermakers, 2,541,472 by Kendall et al., 3,367,778 by Berriman, 2,563,785 by Ives, 2,456,953 by Knott et al. and 2,861,885 by Land, British Pat. 723,019 by Schouwenaars, and U.S. Pat. 3,501,307 by Illingsworth.

The silver halide emulsions may be unwashed or washed to remove soluble salts. In the latter case, the soluble salts may be removed by chill-setting and leaching or the emulsion may be coagulation-washed, e.g., by the procedures described in U.S. Pats. 2,618,556 by Hewitson et al., 2,614,918 by Yutzy et al., 2,565,418 by Yackel, 3,241,969 by Hart et al., and 2,489,341 by Waller et al.

Also, the silver halide emulsions may contain speed-increasing compounds such as polyalkylene glycols, cationic surface active agents and thioethers or combinations of these as described in U.S. Pats. 2,886,437 by Piper, 3,046,134 by Dann et al., 2,944,900 by Carroll et al., and 3,394,540 by Goffe.

Likewise, the silver halide emulsions can be protected against the production of fog and can be stabilized against loss of sensitivity during keeping. Suitable antifoggants and stabilizers each used alone or in combination include thiazolium salts described in U.S. Pats. 2,131,038 by Brooker et al. and 2,694,716 by Allen et al.; the azaindenes described in U.S. Pats. 2,886,437 by Piper and 2,444,605 by Heimbach et al., the mercury salts as described in Allen et al., U.S. Pat. 2,728,663; the urazoles described in Anderson et al., U.S. Pat. 3,287,135; the sulfocatechols descriged in Kennard et al., U.S. Pat. 3,236,652; the oximes described in Carroll et al., British Pat. 623,448; nitron; nitroindazoles; the mercapto-tetrazoles described in U.S. Pats. 2,403,927 by Kendall et al., 3,266,897 by Kennard et al. and 3,397,987 by Luckey et al.; the polyvalent metal salts described in Jones, U.S. Pat. 2,839,405; the thiuronium salts described in Herz et al., U.S. Pat. 3,220,839; the palladium, platinum and gold salts described in U.S. Pats. 2,566,263 by Trivelli et al. and 2,597,915 by Yutzy et al.

The invention can be further illustrated by the following examples.

EXAMPLE 1

A supported single-layer gelatino silver halide emulsion coating, containing per square foot of coating 100 mg. silver, 300 mg. gelatin, 135 mg. of the yellow-dye-forming coupler α-[3-{α-(2,4-di-tert - amylphenoxy) butyramido}-benzoyl]-2-methoxyacetanilide and 68 mg. of the coupler solvent di-n-butyl phthalate, is exposed to a graduated-density test object and developed for 20 minutes at a temperature of 22° C. in a color developing solution of the following composition:

| | | |
|---|---|---|
| 4-amino - 3 - methyl-N-ethyl-N-β-(methanesulfonamido) ethylaniline sulfate hydrate | g | 5.0 |
| Benzyl alcohol | ml | 4.0 |
| Sodium carbonate | g | 50.0 |
| Potassium hydroxide | g | 0.4 |
| Sodium sulfite | g | 2.0 |
| Sodium bromide | g | 0.86 |
| Sodium hexametaphosphate | g | 0.5 |
| Water to 1 liter. | | |
| pH of 10.78. | | |

The element now contains a negative image consisting of developed silver and yellow image dye in proportion to the initial sensitometric exposure. The spectrophotometric profile of the resulting dye image is illustrated by curve y in FIG. 1. The element is then treated in a conventional acid stop-bath and then flash reexposed to effect the exposure of the residual silver halide in the undeveloped areas. The element is then developed at 22° C. in a mask forming color developing solution of the following composition:

| | | |
|---|---|---|
| Sodium carbonate | g | 20.0 |
| Potassium bromide | g | 1.0 |
| Sodium sulfite | g | 1.2 |
| 3-methoxy-4-benzenesulfonamidoaniline hydrochloride | g | 5.0 |
| Ethyl alcohol | ml | 15 |
| Water to 1 liter. | | |
| pH of 12.5. | | |

The element now contains, in addition to the initially developed yellow colored negative dye image, a secondary, essentially colorless, U.V. absorbing dye image whose spectrophotometric absorption profile is illustrated by curve uv in FIG. 1.

EXAMPLE 2

Figure 2:
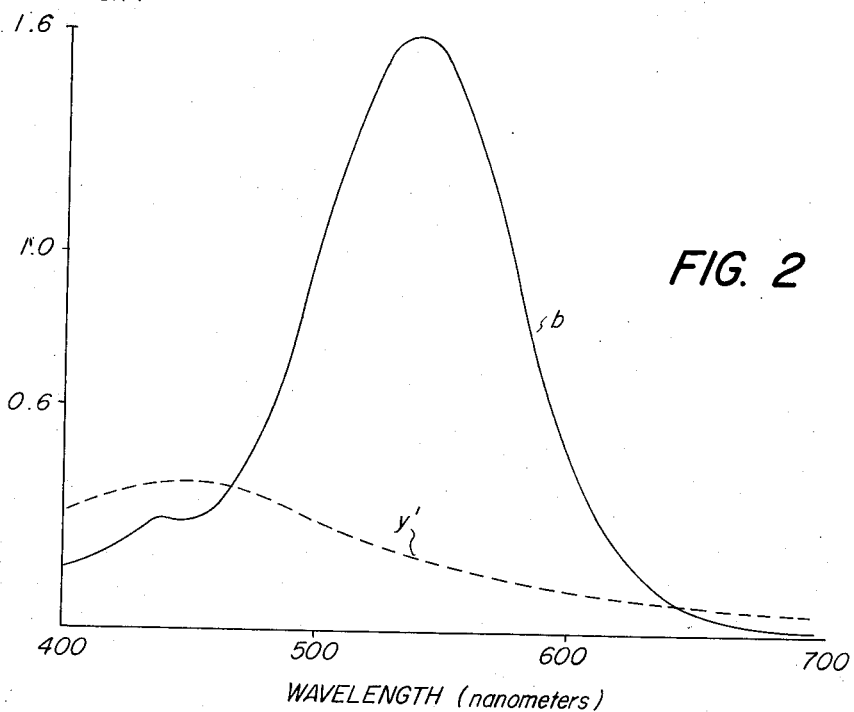

The procedure described in Example 1 is repeated with a similar coating containing 168 mg./ft.$^2$ of the magenta-dye-forming coupler 1-(2,4,6-trichlorophenyl)-3-[2-chloro-5-{α-(4-hydroxy - 3 - tert - butylphenoxy) tetradecanoamido}anilino]-5-pyrazolone. The results are illustrated in FIG. 2 where curve b represents the spectrophotometric profile of the negative magenta dye image, and curve y' represents the spectrophotometric profile of the secondary, yellow colored, positive, masking dye image. The spectrophotometric absorption profile of the yellow dye image shows it to be a suitable yellow mask.

EXAMPLE 3

The procedure described in Example 1 is repeated with a similar coating containing the cyan-dye-forming coupler 1-hydroxy - 2 - [Δ-(2,4-di-tert-amylphenoxy)-n-butyl] naphthamide. The results are illustrated in FIGS. 3 and 4. In FIG. 4 the spectrophotometric absorption profiles of the negative cyan dye image and the positive, blue-green absorbing masking dye image are represented by curves c and m'/y', respectively.

In FIG. 3, curve c represents the densities to red light of the cyan dye scale obtained in this example. Curves mm' and yy' represent the densities of this dye scale to green and blue light, respectively. The portions m and y of these curves are contributed by the cyan dye image, while the portions m' and y' of the curves are contributed by the color masks obtained by p-sulfonamidoaniline color development. The relative flatness of the mm' and yy' curves demonstrates the way in which the positive masks provided by the p-sulfonamidoaniline compensates for the unwanted (blue and green) absorptions of the cyan image.

EXAMPLES 4-9

The procedures of Examples 1-3 are repeated using in the second, mask forming developing solution the following p-sulfonamidoanilines.

Example: p-Sulfonamidoaniline
4 ---- 2,5-dimethoxy - 4 - benzenesulfonamidoaniline hydrochloride.
5 ---- 2-methoxy - 4 - benzenesulfonamidoaniline hydrochloride.
6 ---- 6-chloro - 3 - methoxy - 4 - benzenesulfonamidoaniline hydrochloride.
7 ---- 3,6-dimethyl - 4 - benzenesulfonamidoaniline hydrochloride.
8 ---- 3,6-dimethoxy - 4 - methanesulfonamidoaniline hydrochloride.
9 ---- 3-methyl - 6 - methoxy-4-methanesulfonamidoaniline hydrochloride.

In each example the resulting masking dye image has excellent spectrophotometric properties for use in photographic color elements.

This invention has been described in detail with particular reference to certain preferred embodiments thereof, but there will be understood that variations and modifications can be effected within the spirit and scope of the invention.

I claim:
1. A process for forming an integral color mask in a negative photographic element which comprises (1) a support, and (2) at least one layer thereon containing a silver halide emulsion having in association therewith a photographic color coupler, said process comprising the steps of (1) imagewise exposing said photographic element, (2) developing said element with a first color developing solution, (3) overall reexposing said element and (4) developing said element with a second color developing solution containing a p-sulfonamidoaniline color developing agent of the formula

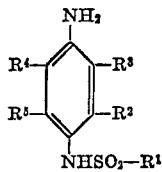

wherein $R^1$ is an alkyl group of 1-8 carbon atoms, or an aryl group of 6-20 carbon atoms, $R^2$, $R^3$, $R^4$, and $R^5$ are each, independently, hydrogen, halogen, an alkyl group, or an alkoxy group, wherein the alkyl group and the alkyl portion of the alkoxy group have from 1-8 carbon atoms.

2. The process according to claim 1 wherein the p-sulfonamidoaniline color developing agent is selected from the group consisting of 3-methoxy-4-benzensulfonamidoaniline hydrochloride,
2-methoxy-4-benzenesulfonamidoaniline hydrochloride,
2,5-dimethoxy-4-benzenesulfonamidoaniline hydrochloride,
6-chloro-3-methoxy-4-benzenesulfonamidoaniline hydrochloride,
3,6-dimethyl-4-benzenesulfonamidoaniline hydrochloride,
3,6-dimethoxy-4-methanesulfonamidoaniline hydrochloride, and
3-methyl-6-methoxy-4-methanesulfonamidoaniline hydrochloride.

3. The process according to claim 1, wherein said photographic color coupler is a phenolic compound, a pyrazolone compound or a compound having an open-chain active ketomethylene group.

4. The process according to claim 1 wherein said silver halide emulsion contains a cyan dye forming color coupler.

5. The process according to claim 1 wherein said silver halide emulsion contains a yellow dye forming color coupler.

6. The process according to claim 1 wherein said silver halide emulsion contains a magneta dye forming color coupler.

7. A process of producing an integral color mask in a negative multilayer photographic element having a silver halide emulsion layer sensitive to the red spectral region and containing a cyan dye forming color coupler, a silver halide emulsion layer sensitive to the green spectral region and containing a magneta dye forming color coupler, and a silver halide emulsion layer sensitive to the blue spectral region and containing a yellow dye forming color coupler, said process comprising the steps of (1) imagewise exposing said element, (2) developing negative dye images with a first color developing solution containing a primary aromatic amino color developing agent, (3) overall reexposing said developed element and (4) developing said reexposed element with a second color developing positive color mask producing solution containing a p-sulfonamidoaniline color developing agent of the formula:

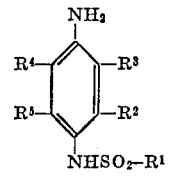

wherein $R^1$ is an alkyl group of 1-8 carbon atoms, or an aryl group of 6-20 carbon atoms, $R^2$, $R^3$, $R^4$ and $R^5$ are each, independently, hydrogen, halogen, an alkyl group, or an alkoxy group, wherein the alkyl group and the alkyl portion of the alkoxy group have from 1-8 carbon atoms.

8. A process according to claim 7 wherein said p-sulfonamidoaniline color developing agent is selected from the group consisting of 3-methoxy-4-benzenesulfonamidoaniline hydrochlroide,
2-methoxy-4-benzenesulfonamidoaniline hydrochlroide,
2,5-dimethoxy-4-benzenesulfonamidoaniline hydrochlroide,
6-chloro-3-methoxy-4-benzenesulfonamidoaniline hydrochlroide,
3,6-dimethyl-4-benzenesulfonamidoaniline hydrochlroide,
3,6-dimethoxy-4-methanesulfonamidoaniline hydrochloride, and
3-methyl-6-methoxy-4-methanesulfonamidoaniline hydrochloride.

9. A process according to claim 1 wherein said photographic color coupler is a phenolic compound, a pyrazole compound or a compound having an open-chain active methylene group.

References Cited
UNITED STATES PATENTS 2,518,739  8/1950  Young ---------------- 96—9
3,535,113  10/1970  Jaeken et al. ---------- 96—74

CHARLES L. BOWERS, JR., Primary Examiner

R. L. SCHILLING, Assistant Examiner

U.S. Cl. X.R.

96—5, 56.6, 66 R